United States Patent
Hayama et al.

(10) Patent No.: US 11,473,684 B2
(45) Date of Patent: *Oct. 18, 2022

(54) CAPACITY CONTROL VALVE

(71) Applicant: Eagle Industry Co., Ltd., Tokyo (JP)

(72) Inventors: Masahiro Hayama, Tokyo (JP); Kohei Fukudome, Tokyo (JP); Keigo Shirafuji, Tokyo (JP); Takahiro Ejima, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 17/299,285

(22) PCT Filed: Dec. 3, 2019

(86) PCT No.: PCT/JP2019/047192
§ 371 (c)(1),
(2) Date: Jun. 2, 2021

(87) PCT Pub. No.: WO2020/116435
PCT Pub. Date: Jun. 11, 2020

(65) Prior Publication Data
US 2022/0057005 A1    Feb. 24, 2022

(30) Foreign Application Priority Data
Dec. 4, 2018   (JP) .............................. JP2018-227597

(51) Int. Cl.
*F16K 31/06*   (2006.01)
*F16K 15/02*   (2006.01)
(Continued)

(52) U.S. Cl.
CPC ........ *F16K 15/026* (2013.01); *F16K 31/0668* (2013.01); *F04B 27/1036* (2013.01); *F04B 53/1087* (2013.01)

(58) Field of Classification Search
CPC ............. F16K 15/0026; F16K 31/0668; F04B 27/1036; F04B 53/1087; F04B 2027/1813;
(Continued)

(56) References Cited

U.S. PATENT DOCUMENTS

| 6,010,312 | A  | 1/2000 | Suitou et al. ............. F04B 1/26 |
| 6,354,811 | B1 | 3/2002 | Ota et al. .................... 417/222.2 |

(Continued)

FOREIGN PATENT DOCUMENTS

| EP | 1081378 | 3/2001 | .............. F04B 27/18 |
| EP | 2594794 | 5/2013 | .............. F04B 27/18 |

(Continued)

OTHER PUBLICATIONS

International Search Report and Written Opinion issued in PCT/JP2019/002207, dated Apr. 23, 2019, with English translation, 13 pages.

(Continued)

*Primary Examiner* — Umashankar Venkatesan
(74) *Attorney, Agent, or Firm* — Hayes Soloway P.C.

(57) ABSTRACT

A capacity control valve includes: a valve housing having a discharge port, a suction port and a control port; a rod driven by a solenoid; a main valve configured to open and close a communication between the discharge port and the control port; an opening and closing valve biased in a valve closing direction, and configured to open and close a CS communication passage communicating with the suction port and a control fluid supply chamber formed in the valve housing; and a CS valve to open and close a communication between the control port and the suction port, the CS valve body being movable relative to the main valve body, wherein the main valve body and the CS valve body move together as the rod moves in a closed state of the main valve.

19 Claims, 9 Drawing Sheets

(51) Int. Cl.
*F04B 27/10* (2006.01)
*F04B 53/10* (2006.01)

(58) Field of Classification Search
CPC ...... F04B 2027/1827; F04B 2027/1831; F04B 53/1082; F04B 27/18
See application file for complete search history.

(56) References Cited

U.S. PATENT DOCUMENTS

| | | | |
|---|---|---|---|
| 6,358,017 B1 | 3/2002 | Ota et al. | 417/222.2 |
| 6,361,283 B1 | 3/2002 | Ota et al. | 417/222.2 |
| 6,485,267 B1 | 11/2002 | Imai et al. | F04B 1/26 |
| 8,021,124 B2 | 9/2011 | Umemura et al. | 417/222.2 |
| 8,079,827 B2 | 12/2011 | Iwa et al. | 417/222.2 |
| 9,732,874 B2 | 8/2017 | Saeki | F04B 27/1804 |
| 9,777,863 B2 | 10/2017 | Higashidozono | F04B 27/1804 |
| 11,053,933 B2 | 7/2021 | Warren | F04B 27/1804 |
| 11,085,431 B2 | 8/2021 | Fukudome | F04B 27/18 |
| 11,156,301 B2 | 11/2021 | Hayama | F16K 31/0627 |
| 2004/0060604 A1 | 4/2004 | Uemura et al. | 137/595 |
| 2005/0035321 A1 | 2/2005 | Uemura | F16K 27/041 |
| 2005/0287014 A1 | 12/2005 | Umemura | F04B 27/1804 |
| 2006/0218953 A1 | 10/2006 | Hirota | 62/228.5 |
| 2007/0214814 A1 | 9/2007 | Umemura et al. | 62/228.1 |
| 2008/0138213 A1 | 6/2008 | Umemura | F04B 27/1804 |
| 2009/0108221 A1 | 4/2009 | Umemura | F04B 27/1804 |
| 2009/0183786 A1 | 7/2009 | Iwa et al. | 137/487.5 |
| 2012/0198992 A1 | 8/2012 | Futakuchi et al. | 91/505 |
| 2012/0198993 A1 | 8/2012 | Fukudome et al. | F04B 27/18 |
| 2013/0126017 A1 | 5/2013 | Ota et al. | F04B 27/1804 |
| 2014/0130916 A1 | 5/2014 | Saeki | F04B 27/1804 |
| 2015/0004010 A1 | 1/2015 | Saeki | F04B 27/1804 |
| 2015/0068628 A1 | 3/2015 | Iwa et al. | F16K 31/06 |
| 2015/0211506 A1 | 7/2015 | Shirafuji et al. | F04B 27/1804 |
| 2015/0345655 A1 | 12/2015 | Higashidozono et al. | F16K 31/0624 |
| 2016/0290326 A1 | 10/2016 | Sugamura | F04B 27/1804 |
| 2017/0175726 A1* | 6/2017 | Kume | F04B 27/1804 |
| 2017/0028462 A1 | 10/2017 | Hayama et al. | F16K 47/06 |
| 2017/0284562 A1 | 10/2017 | Hayama et al. | F16K 47/06 |
| 2017/0356430 A1 | 12/2017 | Irie et al. | F04B 27/1804 |
| 2018/0291888 A1 | 10/2018 | Tonegawa | F16K 31/0624 |
| 2020/0362974 A1 | 11/2020 | Hayama | F04B 49/22 |
| 2021/0285433 A1* | 9/2021 | Hayama | F04B 27/1804 |
| 2022/0034414 A1* | 2/2022 | Ito | F04B 27/18 |

FOREIGN PATENT DOCUMENTS

| | | | |
|---|---|---|---|
| EP | 2784320 | 10/2014 | F04B 27/18 |
| EP | 3431760 | 1/2019 | F04B 27/18 |
| JP | 5-306679 | 11/1993 | F04B 27/08 |
| JP | 6-200875 | 7/1994 | F04B 27/08 |
| JP | 7-27049 | 1/1995 | F04B 27/10 |
| JP | 9-144929 | 6/1997 | F16K 31/06 |
| JP | 2000-345961 | 12/2000 | F04B 27/14 |
| JP | 2001-73939 | 3/2001 | F04B 27/14 |
| JP | 2001-132632 | 5/2001 | F04B 27/14 |
| JP | 2003-42062 | 2/2003 | F04B 27/14 |
| JP | 2006-52648 | 2/2006 | F04B 27/14 |
| JP | 2006-307828 | 11/2006 | F04B 27/14 |
| JP | 2007-247512 | 9/2007 | F04B 27/14 |
| JP | 2008-14269 | 1/2008 | F04B 27/14 |
| JP | 2008-202572 | 9/2008 | F04B 27/14 |
| JP | 4242624 | 1/2009 | F04B 49/00 |
| JP | 2011-32916 | 2/2011 | F04B 27/14 |
| JP | 4700048 | 3/2011 | F04B 49/00 |
| JP | 5167121 | 12/2012 | F04B 27/14 |
| JP | 2014-118939 | 6/2014 | F04B 27/14 |
| JP | 5557901 | 6/2014 | F04B 27/14 |
| JP | 2014-190247 | 10/2014 | F04B 27/14 |
| JP | 2016-196876 | 11/2016 | F04B 27/18 |
| JP | 2017-129042 | 7/2017 | F04B 27/18 |
| JP | 6206274 | 10/2017 | F04B 27/18 |
| JP | 2017-223348 | 12/2017 | F16K 11/10 |
| JP | 2018-21646 | 2/2018 | F16K 31/06 |
| JP | 2018-40385 | 3/2018 | F16K 31/06 |
| JP | 2018-145877 | 9/2018 | F04B 39/14 |
| JP | 2019-2384 | 1/2019 | F04B 27/18 |
| WO | WO2007119380 | 10/2007 | F04B 27/14 |
| WO | WO2011021789 | 2/2011 | F04B 27/14 |
| WO | WO2011135911 | 11/2011 | F04B 27/14 |
| WO | WO2013109005 | 7/2013 | F04B 49/06 |
| WO | WO2013176012 | 11/2013 | F04B 27/14 |
| WO | WO2014091975 | 6/2014 | F04B 27/14 |
| WO | WO2014119594 | 8/2014 | F04B 27/14 |
| WO | WO2016104390 | 6/2016 | F16K 31/06 |
| WO | WO2017057160 | 4/2017 | F04B 27/18 |
| WO | WO2017159553 | 9/2017 | F04B 27/18 |
| WO | WO2018207461 | 11/2018 | F04B 27/18 |
| WO | WO2019167912 | 9/2019 | F04B 27/18 |

OTHER PUBLICATIONS

International Preliminary Report on Patentability issued in PCT/JP2019/002207, dated Jul. 28, 2020, 7 pages.
International Search Report and Written Opinion issued in PCT/JP2019/005200, dated Apr. 23, 2019, with English translation, 12 pages.
International PreliIninary Report on Patentability issued in PCT/JP2019/005200, dated Aug. 18, 2020, 7 pages.
International Search Report and Written Opinion issued in PCT/JP2019/007187, dated Apr. 23, 2019, with English translation, 16 pages.
International Preliminary Report on Patentability issued in PCT/JP2019/007187, dated Sep. 3, 2020, 8 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24, 2020, with English translation, 6 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.

(56) References Cited

OTHER PUBLICATIONS

International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
International Search Report and Written Opinion issued in PCT/JP2019/043374, dated Jan. 7, 2020, with English translation, 10 pages.
International Preliminary Report on Patentability issued in PCT/JP2019/043374, dated May 11, 2021, 4 pages.
International Search Report and Written Opinion issued in PCT/JP2019/047192, dated Jun. 11, 2020, with English translation, 15 pages.
International Preliminary Report on Patentability issued in PCT/JP2019/047192, dated Jun. 8, 2021, 4 pages.
International Search Report and Written Opinion issued in PCT/JP2020/001443, dated Mar. 31, 2020, with English translation, 15 pages.
International Preliminary Report on Patentability issued in PCT/JP2020/001443, dated Jul. 29, 2021, 8 pages.
International Search Report and Written Opinion issued in PCT/JP2020/007953, dated Apr. 7, 2020, with English translation, 17 pages.
International Preliminary Report on Patentability issued in PCT/JP2020/007953, dated Sep. 16, 2021, 10 pages.
International Search Report and Written Opinion issued in PCT/JP2020/015181, dated Jun. 16, 2020, with English translation, 11 pages.
International Preliminary Report on Patentability issued in PCT/JP2020/015181, dated Oct. 14, 2021, 5 pages.
International Search Report and Written Opinion issued in PCT/JP2020/015175, dated Jun. 23, 2020, with English translation, 13 pages.
International Preliminary Report on Patentability issued in PCT/JP2020/015175, dated Oct. 14, 2021, 6 pages.
U.S. Official Action issued in related US Patent Application U.S. Appl. No. 17/259,138, dated Jan. 18, 2022, 14 pages.
Notice of Allowance issued in related U.S. Appl. No. 17/287,086, dated Feb. 2, 2022, 7 pages.
Chinese Official Action issued in related application serial No. 201980044409.4, dated Jan. 26, 2022, with translation, 10 pages.
Chinese Official Action issued in related application serial No. 201980044138.2, dated Mar. 30, 2022, with translation, 9 pages.
Chinese Official Action issued in related application serial No. 201980044077.x, dated Apr. 2, 2022, with translation, 11 pages.
Chinese Official Action issued in related application serial No. 201980046798.4, dated Apr. 6, 2022, with translation, 8 pages.
European Search Report issued in related application serial No. 198148099.8, dated Feb. 9, 2022, 7 pages.
European Search Report issued in related application serial No. 19834984.7, dated Feb. 21, 2022, 12 pages.
European Search Report issued in related application serial No. 19833331.2, dated Mar. 30, 2022, 6 pages.
European Search Report issued in related application serial No. 19847690.5, dated Feb. 9, 2022, 5 pages.
European Search Report issued in related application serial No. 19847395.1, dated Feb. 9, 2022, 5 pages.
European Search Report issued in related application serial No. 19834556.3, dated Feb. 17, 2022, 7 pages.
European Search Report issued in related application serial No. 19833028.4, dated Apr. 7, 2022, 8 pages.
U.S. Official Action issued in related U.S. Appl. No. 17/256,953, dated Apr. 15, 2022, 18 pages.
U.S. Official Action issued in related U.S. Appl. No. 17/259,138, dated Mar. 31, 2022, 5 pages.
U.S. Official Action issued in related U.S. Appl. No. 17/256,955, dated Feb. 18, 2022, 19 pages.
U.S. Official Action issued in related U.S. Appl. No. 17/256,959, dated May 5, 2022, 18 pages.
European Search Report issued in related application serial No. 19894059.5, dated Jun. 7, 2022, 4 pages.
European Search Report issued in related application serial No. 19883193.5, dated May 23, 2022, 5 pages.
U.S. Official Action issued in related U.S. Appl. No. 17/259,138, dated Jan. 19, 2022, 6 pages.
U.S. Official Action issued in related U.S. Appl. No. 17/433,558, dated May 25, 2022, 11 pages.

\* cited by examiner

CAPACITY CONTROL VALVE

TECHNICAL FIELD

The present invention relates to a capacity control valve that variably controls the capacity of a working fluid, for example, to a capacity control valve that controls the discharge amount of a variable displacement compressor, which is used in an air conditioning system of an automobile, according to pressure.

BACKGROUND ART

A variable displacement compressor used in an air conditioning system of an automobile or the like includes a rotary shaft that is rotationally driven by an engine; a swash plate that is coupled to the rotary shaft such that the inclination angle of the swash plate with respect thereto is variable; a piston for compression coupled to the swash plate; and the like. When the inclination angle of the swash plate is changed, the stroke amount of the piston is changed to control the discharge amount of a fluid. The capacity control valve, of which the opening and closing is driven by electromagnetic force, appropriately controls the internal pressure of a control chamber while using a suction pressure Ps of a suction chamber that suctions the fluid, a discharge pressure Pd of a discharge chamber that discharges the fluid pressurized by the piston, and a control pressure Pc of the control chamber that accommodates the swash plate, so that the inclination angle of the swash plate can be continuously changed.

During continuous driving of the variable displacement compressor, the capacity control valve performs normal control where a valve body is moved in an axial direction by electromagnetic force which is generated in a solenoid when energization is controlled by a control computer, so that a main valve is opened and closed to adjust the control pressure Pc of the control chamber of the variable displacement compressor.

During normal control of the capacity control valve, the pressure of the control chamber in the variable displacement compressor is appropriately controlled and the inclination angle of the swash plate with respect to the rotary shaft is continuously changed, so that the stroke amount of the piston is changed to control the discharge amount of the fluid to the discharge chamber; and thereby, the cooling capacity of the air conditioning system is adjusted to a desired cooling capacity. In addition, when the variable displacement compressor is driven at the maximum capacity, the main valve of the capacity control valve is closed to lower the pressure of the control chamber, so that the inclination angle of the swash plate is maximized.

In addition, there is known a configuration where an auxiliary communication passage through which a control port and a suction port of the capacity control valve communicate with each other is formed, and a refrigerant of the control chamber of the variable displacement compressor during startup is discharged to the suction chamber of the variable displacement compressor through the control port, the auxiliary communication passage, and the suction port to quickly lower the pressure of the control chamber during startup; and thereby, the responsiveness of the variable displacement compressor is improved (refer to Patent Citation 1).

CITATION LIST

Patent Literature

Patent Citation 1: JP 5167121 B2 (page 7 and FIG. 2)

SUMMARY OF INVENTION

Technical Problem

However, according to Patent Citation 1, since the fluid discharge function during startup is good but the auxiliary communication passage is always in communication, during continuous driving of the variable displacement compressor, the refrigerant flows from the control port into the suction port via the auxiliary communication passage, and thus the compression efficiency is deteriorated, which is a problem.

The invention has been made in light of such a problem, and an object of the invention is to provide a capacity control valve having a good fluid discharge function during startup and a high compression efficiency.

Solution to Problem

In order to solve the foregoing problem, according to the present invention, there is provided a capacity control valve including: a valve housing provided with a discharge port through which a discharge fluid at a discharge pressure passes, a suction port through which a suction fluid at a suction pressure passes, and a control port through which a control fluid at a control pressure passes; a rod driven by a solenoid; a main valve that includes a main valve seat and a main valve body to open and close a communication between the discharge port and the control port in accordance with a movement of the rod moves; an opening and closing valve including an opening and closing valve seat and an opening and closing valve body biased in a valve closing direction, the opening and closing valve being configured to open and close a CS communication passage communicating with the suction port and a control fluid supply chamber formed in the valve housing, the control fluid being supplied to the control fluid supply chamber; and a CS valve that includes a CS valve seat and a CS valve body to open and close a communication between the control port and the suction port, the CS valve body being disposed so as to be movable relative to the main valve body, wherein the main valve body and the CS valve body move together as the rod moves in a closed state of the main valve. According to the aforesaid feature of the present invention, since the main valve body is disposed so as to be movable relative to the CS valve body, during normal control, the opening and closing of the main valve can be controlled in a state where the CS valve is closed, and in a maximum energized state, as the rod moves while the closed state of the main valve is maintained, the main valve body moves together with the CS valve body to open the CS valve and to cause the control port and the suction port to communicate with each other, so that the control pressure can be lowered. Therefore, the capacity control valve having a good fluid discharge function during startup and a high compression efficiency can be provided. In addition, during startup, normal control, or the like, the opening and closing valve body operates in a valve opening direction according to a predetermined suction pressure in the CS communication passage to cause the control fluid supply chamber and the suction port to communicate with each other via the CS communication passage, so that the control pressure can be lowered. Therefore, the capacity control valve having a stable fluid discharge function and compression performance during startup can be provided.

It may be preferable that the CS valve body is externally fitted to the main valve body, and the main valve seat is formed in an inner diameter portion of the CS valve body. According to this preferable configuration, since the main valve body is inserted into the CS valve body, the capacity control valve including the CS valve can be compactly configured, and the main valve body can move together with the CS valve body while a closed state of the main valve is reliably maintained.

It may be preferable that the main valve seat is formed at one end of the CS valve body, and the CS valve seat is formed on an outer diameter side of the main valve seat. According to this preferable configuration, since the main valve seat is formed in the inner diameter portion of one end of the CS valve body, and the CS valve seat is formed on the outer diameter side of the main valve seat, switching between the flow passages by the opening and closing of the main valve and the CS valve can be smoothly performed, and thus the responsiveness is good.

It may be preferable that the CS valve body is biased in a valve closing direction of the CS valve by biasing means. According to this preferable configuration, since the CS valve body can reliably move to a closed valve position, the capacity control valve can immediately return from a maximum energized state to normal control.

It may be preferable that the control fluid from the control port is introduced to one end side of the CS valve body, and the control fluid supplied to the control fluid supply chamber is introduced to the other end side of the CS valve body. According to this preferable configuration, since the control pressures are applied to the CS valve body from both ends, the CS valve body can move together with the main valve body in a state where the influence of the pressures is suppressed; and thereby, the valve body can be precisely controlled according to a current applied to the solenoid.

It may be preferable that effective areas of both ends of the CS valve body are equal to each other. According to this preferable configuration, since the control pressures applied to both ends of the CS valve body are cancelled out, the valve body can be more precisely controlled.

It may be preferable that the main valve body forms an auxiliary valve that opens and closes a communication between the CS communication passage and the suction port. According to this preferable configuration, during startup, normal control, or the like, the auxiliary valve can be opened as the main valve body moves, and thus the CS communication passage can be effective.

DESCRIPTION OF EMBODIMENTS

A mode for implementing a capacity control valve according to the invention will be described below based on an embodiment.

Embodiment

A capacity control valve according to an embodiment of the present invention will be described with reference to FIGS. 1 to 9. In the following description, right and left sides of FIG. 2 as viewed from a front side are right and left sides of the capacity control valve.

A capacity control valve V of the invention is assembled into a variable displacement compressor M used in an air conditioning system of an automobile or the like to variably control the pressure of a working fluid. (hereinafter, simply referred to as a "fluid") which is a refrigerant, so that the discharge amount of the variable displacement compressor M is controlled to adjust the cooling capacity of the air conditioning system to a desired cooling capacity.

Figure 1:
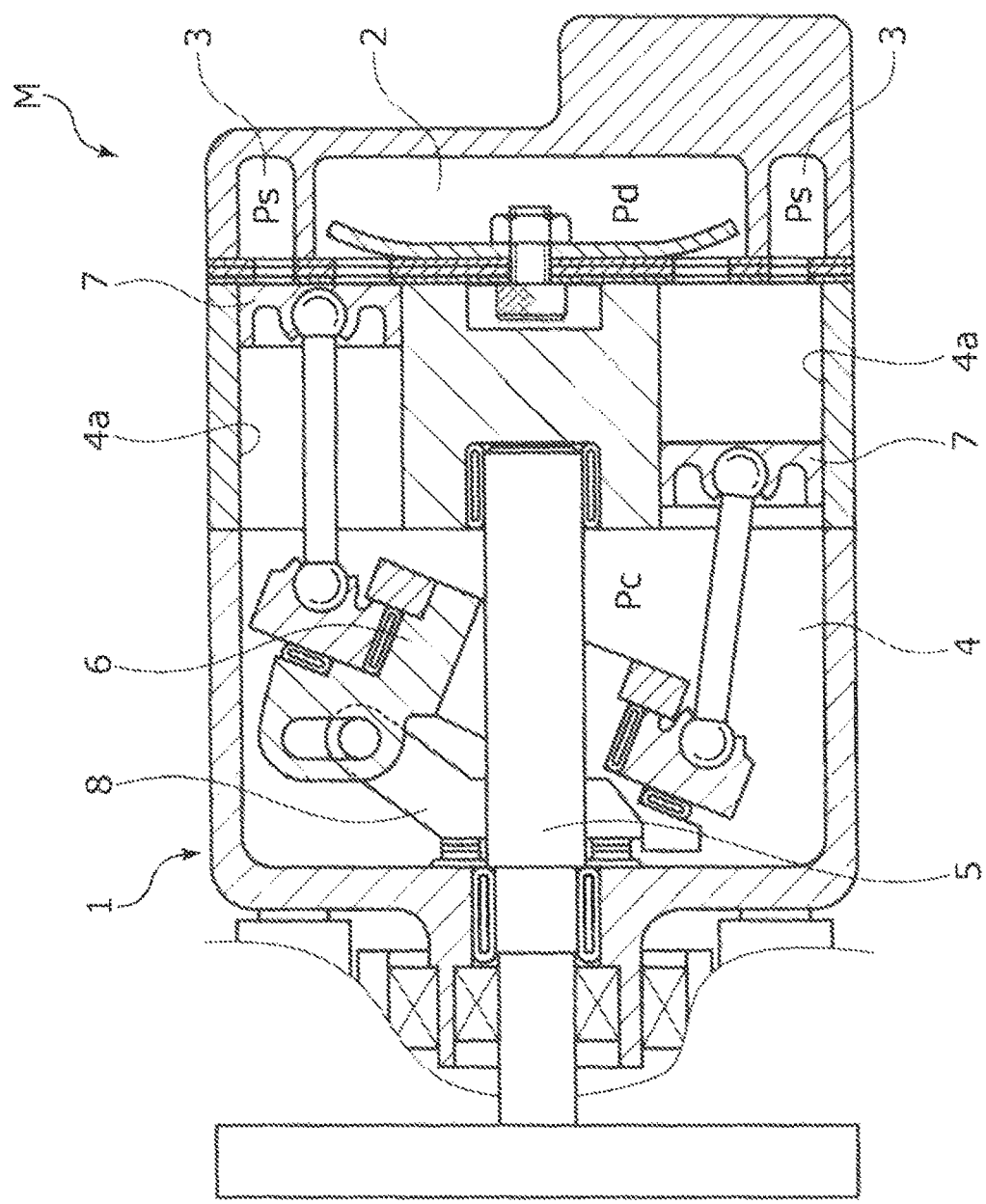
FIG. 1 is a schematic configuration view illustrating a swash plate-type variable displacement compressor into which a capacity control valve according to an embodiment of the invention is assembled.

First, the variable displacement, compressor M will be described. As illustrated in FIG. 1, the variable displacement compressor M includes a casing 1 including a discharge chamber 2, a suction chamber 3, a control chamber 4, and a plurality of cylinders 4a. Incidentally, the variable displacement compressor M is provided with a communication passage (unillustrated) through which the control chamber 4 and the suction chamber 3 communicate directly with each other, and the communication passage is provided with a fixed orifice that balances the pressures of the suction chamber 3 and the control chamber 4.

In addition, the variable displacement compressor N includes a rotary shaft 5 that is rotationally driven by an engine (unillustrated) installed outside the casing 1; a stash plate 6 that is eccentrically coupled to the rotary shaft 5 by a hinge mechanism 8 in the control chamber 4; and a plurality of pistons 7 that are coupled to the swash plate 6 and are reciprocatably fitted into the cylinders 4a. The capacity control valve V, of which the opening and closing is driven by electromagnetic force, appropriately controls the internal pressure of the control chamber 4 while using a suction pressure Ps of the suction chamber 3 that suctions the fluid, a discharge pressure Pd of the discharge chamber 2 that discharges the fluid pressurized by the pistons 7, and a control pressure Pc of the control chamber 4 that accommodates the awash plate 6, so that the inclination angle of the swash plate 6 is continuously changed; and thereby, the stroke amounts of the pistons 7 are changed to control the discharge amount of the fluid. Incidentally, for convenience of description, in FIG. 1, the capacity control valve V that is assembled into the variable displacement compressor M is unillustrated.

Specifically, the higher the control pressure Pc in the control chamber 4, the smaller the inclination angle of the swash plate 6 with respect to the rotary shaft 5, and thus the stroke amounts of the pistons 7 are reduced, and when the control pressure Pc is a certain pressure or higher, the swash plate 6 is substantially perpendicular to the rotary shaft 5, namely, is slightly inclined with respect to perpendicularity. In this case, since the stroke amounts of the pistons 7 are minimized and the pressurization of the fluid in the cylinders 4a by the pistons 7 is minimized, the discharge amount of the fluid to the discharge chamber 2 is reduced, and the cooling capacity of the air conditioning system is minimized. On the other hand, the lower the control pressure Pc in the control chamber 4, the larger the inclination angle of the swash plate 6 with respect to the rotary shaft 5, and thus the stroke amounts of the pistons 7 are increased, and when the control pressure Pc is a certain pressure or lower, the inclination angle of the swash plate 6 with respect to the rotary shaft 5 is maximized. In this case, since the stroke amounts of the pistons 7 are maximized and the pressurization of the fluid in the cylinders 4a by the pistons 7 is maximized, the discharge amount of the fluid to the discharge chamber 2 is increased, and the cooling capacity of the air conditioning system is maximized.

Figure 2:
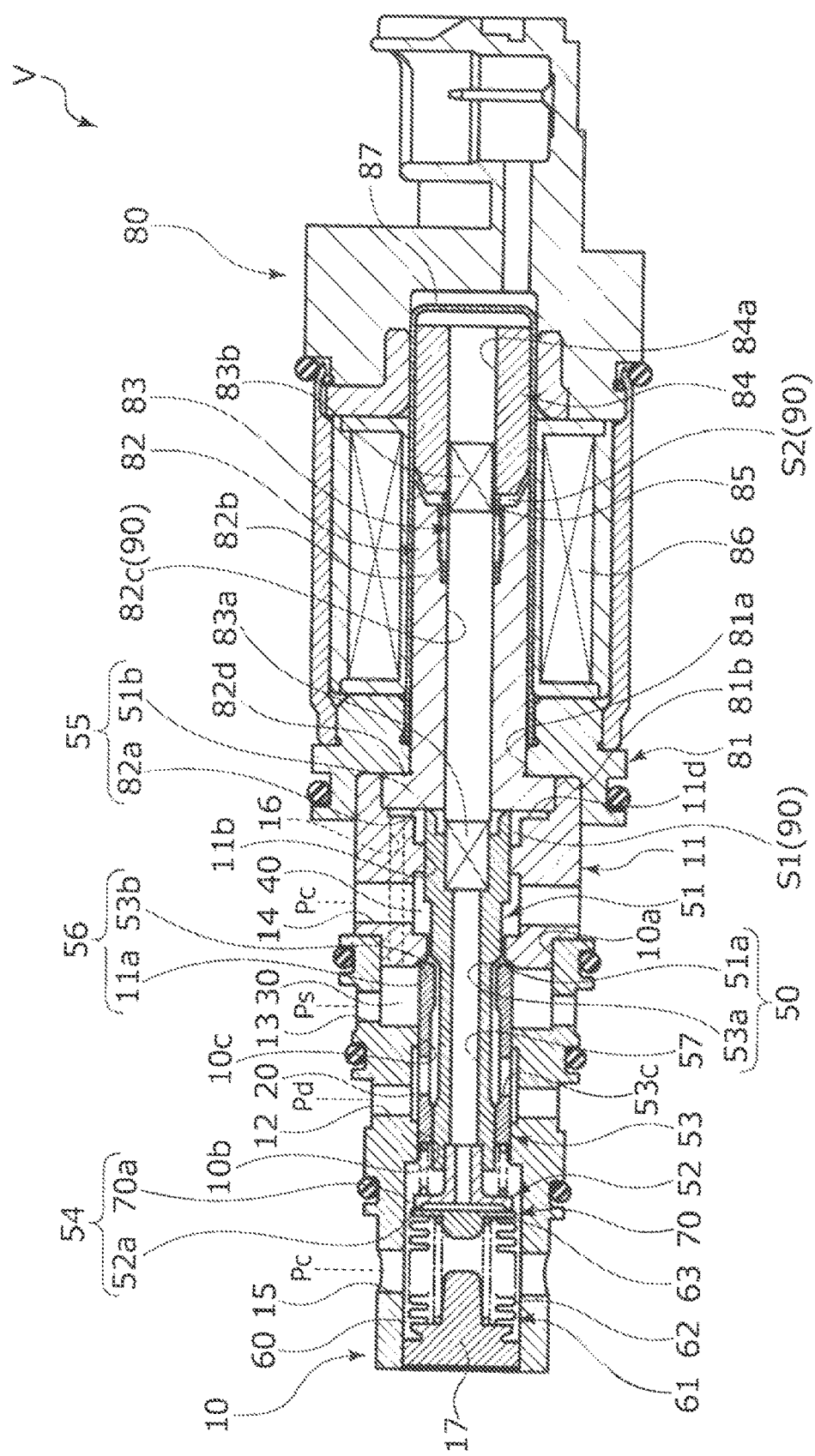
FIG. 2 is a cross-sectional view illustrating a state where a main valve is opened and a CS valve is closed when the capacity control valve according to the embodiment is in a de-energized state.

As illustrated in FIG. 2, in the capacity control valve V assembled into the variable displacement compressor M, a current with which a coil 86 forming a solenoid 80 is to be energized is adjusted to control the opening and closing of a main valve 50, an auxiliary valve 55, and a CS valve 56 in the capacity control valve V, namely, the opening and closing of valves that open and close communication between a control port and a suction port, and the opening and closing of a pressure sensitive valve 54 as an opening and closing valve is controlled by the suction pressure Ps in an intermediate communication passage 57 as a CS communication passage, so that the fluid flowing into the control chamber 4 or flowing out from the control chamber 4 is controlled; and thereby, the control pressure Pc in the control chamber 4 is variably controlled. Incidentally, hollow holes which are formed inside a main and auxiliary valve body 51 as a main valve body and a pressure sensitive valve member 52 are connected to each other, so that the intermediate communication passage 57 penetrates therethrough in an axial direction.

In the present embodiment, the main valve 50 includes the main and auxiliary valve body 51 and a main valve seat 53a that is formed in an inner diameter portion of a right, axial end which is one end of a CS valve body 53, and a step portion 51a that is formed at substantially the center in the axial direction of the main and auxiliary valve body 51 comes into contact with and separates from the main valve seat 53a to open and close the main valve 50. The pressure sensitive valve 54 includes an adapter 70 forming a pressure sensitive body 61 as an opening and closing valve body and a pressure sensitive valve seat 52a as an opening and closing valve seat formed at a left axial end of the pressure sensitive valve member 52, and an outer diameter portion 70a of a right axial end surface of the adapter 70 comes into contact with and separates from the pressure sensitive valve seat 52a to open and close the pressure sensitive valve 54. The auxiliary valve 55 includes the main and auxiliary valve body 51 and an auxiliary valve seat 82a that is formed in an inner diameter portion of a left axial end surface which is an opening end surface of a fixed core 82, and a right axial end 51b of the main and auxiliary valve body 51 comes into contact with and separates from the auxiliary valve seat 82a to open and close the auxiliary valve 55. The CS valve 56 includes the CS valve body 53 and a CS valve seat 11a that is formed in an inner diameter portion of a left axial end of a second valve housing 11 forming a valve housing, and an outer diameter portion 53b of a right axial end that is one end of the CS valve body 53 comes into contact with and separates from the CS valve seat 11a to open and close the CS valve 56.

Next, the structure of the capacity control valve V will be described. As illustrated in FIG. 2, the capacity control valve V mainly includes a first valve housing 10 and the second valve housing 11 as the valve housing made of a metallic material or a resin material; the main and auxiliary valve body 51, the pressure sensitive valve member 52, and the CS valve body 53 that are disposed in the first valve housing 10 and the second valve housing 11 so as to be reciprocatable in the axial direction; the pressure sensitive body 61 that applies rightward axial biasing force to the main and auxiliary valve body 51, the pressure sensitive valve member 52, and the CS valve body 53 according to the suction pressure Ps in the intermediate communication passage 57; and the solenoid 80 that is connected to the second valve housing 11 to apply driving force to the main and auxiliary valve body 51, the pressure sensitive valve member 52, and the CS valve body 53.

As illustrated in FIG. 2, the solenoid 80 mainly includes a casing 81 having an opening portion 81a that is open leftward in the axial direction; the fixed core 82 that has a substantially cylindrical shape, and is inserted into the opening portion 81a of the casing 81 from the left in the axial direction to be fixed to an inner diameter side of the casing 81; a drive rod 83 as a rod which is inserted into the fixed core 82 to be reciprocatable in the axial direction and of which a left axial end portion 83a is inserted into and fixed to the main and auxiliary valve body 51; a movable core 84 to which a right axial end portion 83b of the drive rod 83 is inserted into and fixed; a coil spring 85 that is provided between the fixed core 82 and the movable core 84 to bias the movable core 84 rightward in the axial direction, namely, a valve opening direction of the main valve 50; and the coil 86 for excitation that is wound around the outside of the fixed core 82 via a bobbin.

An inner diameter side of a left axial end of the casing 81 is recessed rightward in the axial direction to form a recessed portion 81b, and a right axial end portion of the second valve housing 11 is inserted into and fixed to the recessed portion 81b in a substantially sealed manner.

The fixed core 82 is formed of a rigid body made of a magnetic material such as iron or silicon steel, and includes a cylindrical portion 82b provided with an insertion hole 82c into which the drive rod 83 extending in the axial direction is inserted, and a flange portion 82*d* that has an annular shape and extends outward in a radial direction from an outer peripheral surface of a left axial end portion of the cylindrical portion 82*b*. The auxiliary valve seat 82*a* is formed in the inner diameter portion of the opening end surface of the fixed core 82, namely, a left axial end surface of the cylindrical portion 82*b*.

In addition, the fixed core 82 is inserted into and fixed to a recessed portion lid in a substantially sealed manner in a state where a right axial end surface of the flange portion 82*d* is in contact with a bottom surface of the recessed portion 81*b* of the casing 81, and the recessed portion lid is formed by recessing an inner diameter side of a right axial end of the second valve housing 11, which is inserted into and fixed to the recessed portion 81*b* of the casing 81, leftward in the axial direction.

The drive rod 83 is formed in a columnar shape, and the left axial end portion 83*a* of the drive rod 83 which is inserted into and fixed to the main and auxiliary valve body 51 and the right axial end portion 83*b* of the drive rod 83 which is inserted into and fixed to the movable core 84 have a plate shape.

In the capacity control valve V, the fixed core 82 and the second valve housing 11 are mounted to the casing 81, so that a space S1 is formed by a left axial end surface of the flange portion 82*d* of the fixed core 82 and an inner peripheral surface of the recessed portion 11*d* of the second valve housing 11. In addition, in the capacity control valve V, a cup 87 having a bottomed cylindrical shape is externally fitted to the cylindrical portion 82*b* of the fixed core 82 from the right in the axial direction in a substantially sealed manner, so that a space S2 is formed by a right, axial end of the cylindrical portion 82*b* and an inner peripheral surface of the cup 87. In addition, the space 51 communicates with the space S2 via a gap between an inner peripheral surface of the insertion hole 82*c* of the fixed core 82 and an outer peripheral surface of the drive rod 83, and the spaces S1 and S2 and the insertion hole 82*c* of the fixed core 82 form an accommodation chamber 90 in which a rear side of the main and auxiliary valve body 51 is accommodated. Incidentally, the movable core 84 disposed in the space 52 is provided with a through-hole 84*a* extending in the axial direction, and the right axial end portion 83*b* having a plate shape of the drive rod 83 is inserted into and fixed to the through-hole 84*a* from the left in the axial direction, so that a plate surface of the right axial end portion 83*b* of the drive rod 83 and an inner peripheral surface of the through-hole 84*a* communicate with each other and the fluid always flows between a right axial end of the movable core 84 and a bottom surface of the cup 87.

As illustrate in FIG. 2, the first valve housing 10 is provided with a Pd port 12 as a discharge port communicating with the discharge chamber 2 of the variable displacement compressor M, a Ps port 13 as a suction port communicating with the suction chamber 3 of the variable displacement compressor M, and a second Pc port 15 communicating with the control chamber 4 of the variable displacement compressor M. In addition, the second valve housing 11 is provided with a first Pc port 14 as a control port communicating with the control chamber 4 of the variable displacement compressor M. Incidentally, the ports are disposed in order of the first Pc port 14, the Ps port 13, the Pd port 12, and the second Pc port 15 from the right side in the axial direction, namely, a solenoid 80 side.

In addition, a right axial end of the first valve housing 10 is recessed leftward in the axial direction to form a recessed portion 10*a*, and a left axial end portion of the second valve housing 11 is inserted into the recessed portion 10*a* from the right in the axial direction, so that the second valve housing 11 is integrally connected and fixed to the first valve housing 10 in a substantially sealed state. In addition, a partition adjustment member 17 is press-fitted into a left axial end portion of the first valve housing 10 in a substantially sealed manner, so that the first valve housing 10 has a substantially bottomed cylindrical shape. Incidentally, the partition adjustment member 17 can adjust the installation position in the axial direction of the first valve housing 10 to adjust the biasing force of the pressure sensitive body 61.

In addition, a first valve chamber 20 which communicates with the Pd port 12 and in which a Pd communication hole 53*c* penetrating through the CS valve body 53 in the radial direction is disposed, a second valve chamber 30 which communicates with the Ps port 13 and in which a right axial end portion as one end portion of the CS valve body 53 is disposed, and a pressure sensitive chamber 60 as a control fluid supply chamber which communicates with the second Pc port 15 and in which the pressure sensitive body 61 is disposed are formed inside the first valve housing 10. In addition, a third valve chamber 40 which communicates with the first Pc port 14 and in which a large diameter portion 51*c* and a medium diameter portion 51*d* (refer to FIGS. 4 to 6 and FIGS. 8 and 9) on a right axial end side of the main and auxiliary valve body 51 are disposed is formed inside the second valve housing 11.

In addition, the main and auxiliary valve body 51, the pressure sensitive valve member 52 connected to the main and auxiliary valve body 51, and the CS valve body 53 are disposed in the first valve housing 10 and the second valve housing 11 so as to be reciprocatable in the axial direction, and guide holes 10*b* and 10*c* which have small diameters and against which an outer peripheral surface of the CS valve body 53 is slidable in a substantially sealed state are formed at substantially the center in the axial direction of an inner peripheral surface of the first valve housing 10. Incidentally, the inner diameters of the guide holes 10*b* and 10*c* of the first valve housing 10 are substantially equal. In addition, a guide hole 11*b* which has a small diameter and against which an outer peripheral surface of the main and auxiliary valve body 51 is slidable in a substantially sealed state is formed in a right axial end portion of an inner peripheral surface of the second valve housing 11. Furthermore, the CS valve seat a1a with which the outer diameter portion 53*b* of the right axial end of the CS valve body 53 can come into contact is formed in an inner diameter portion of a left axial end of the second valve housing 11.

Inside the first valve housing 10, the first valve chamber 20 and the second valve chamber 30 are partitioned off from each other by the outer peripheral surface of the CS valve body 53 and an inner peripheral surface of the guide hole 10*c*, and the first valve chamber 20 and the pressure sensitive chamber 60 are partitioned off from each other by the outer peripheral surface of the CS valve body 53 and an inner peripheral surface of the guide hole 10*b*. Incidentally, the inner peripheral surfaces of the guide holes 10*b* and 10*c* and the outer peripheral surface of the CS valve body 53 are slightly separated from each other in the radial direction to form very small gaps therebetween, and the CS valve body 53 is smoothly movable relative to the first valve housing 10 in the axial direction.

In addition, inside the second valve housing 11, the third valve chamber 40 and the accommodation chamber 90 (space S1) are partitioned of from each other by an outer peripheral surface of the large diameter portion 51*c* of the main and auxiliary valve body 51 and the inner peripheral surface of the guide hole 11b. Incidentally, the inner peripheral surface of the guide hole 11b and the outer peripheral surface of the main and auxiliary valve body 51 are slightly separated from each other in the radial direction to form a very small gap therebetween, and the main and auxiliary valve body 51 is smoothly movable relative to the second valve housing 11 in the axial direction.

Figure 3:
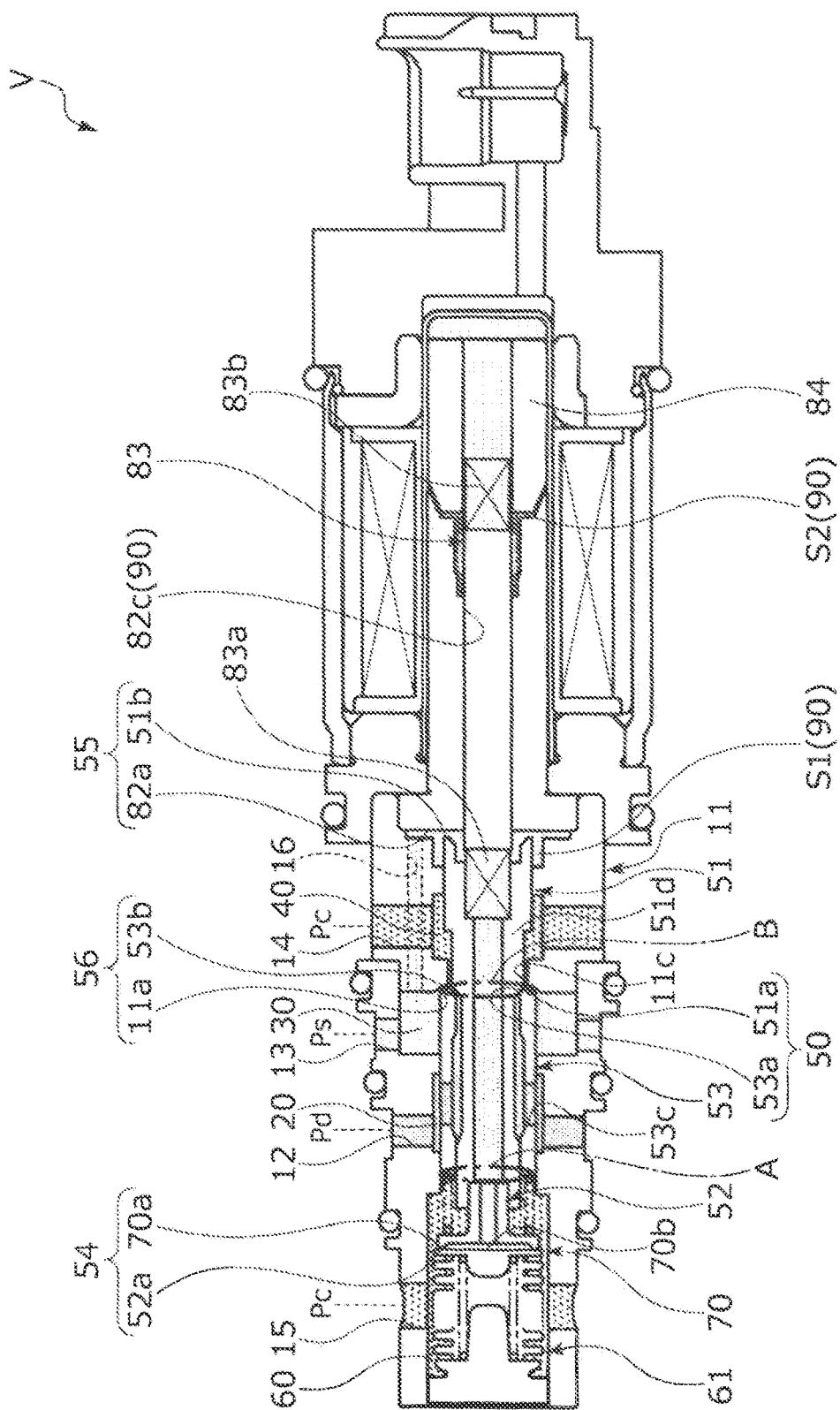
FIG. 3 is a cross-sectional view illustrating a pressure distribution when the main valve and the CS valve are closed in an energized state (e.g., during normal control) of the capacity control valve according to the embodiment. Incidentally, in order to illustrate the pressure distribution, the hatching of the cross section of each member is omitted.
Figure 4:
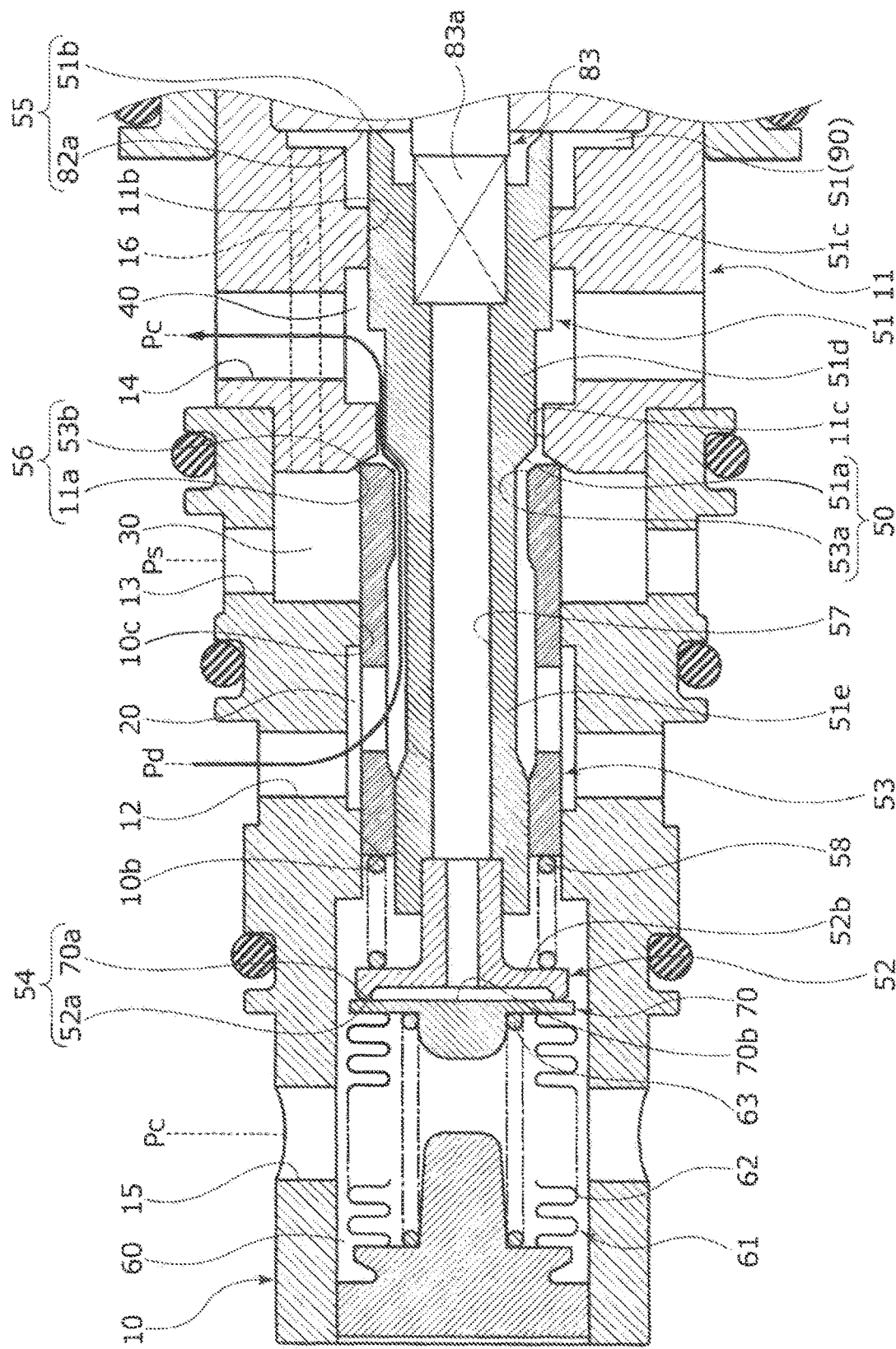
FIG. 4 is an enlarged cross-sectional view of FIG. 2 illustrating a state where the main valve is opened and the CS valve is closed when the capacity control valve according to the embodiment is in a de-energized state.
Figure 5:
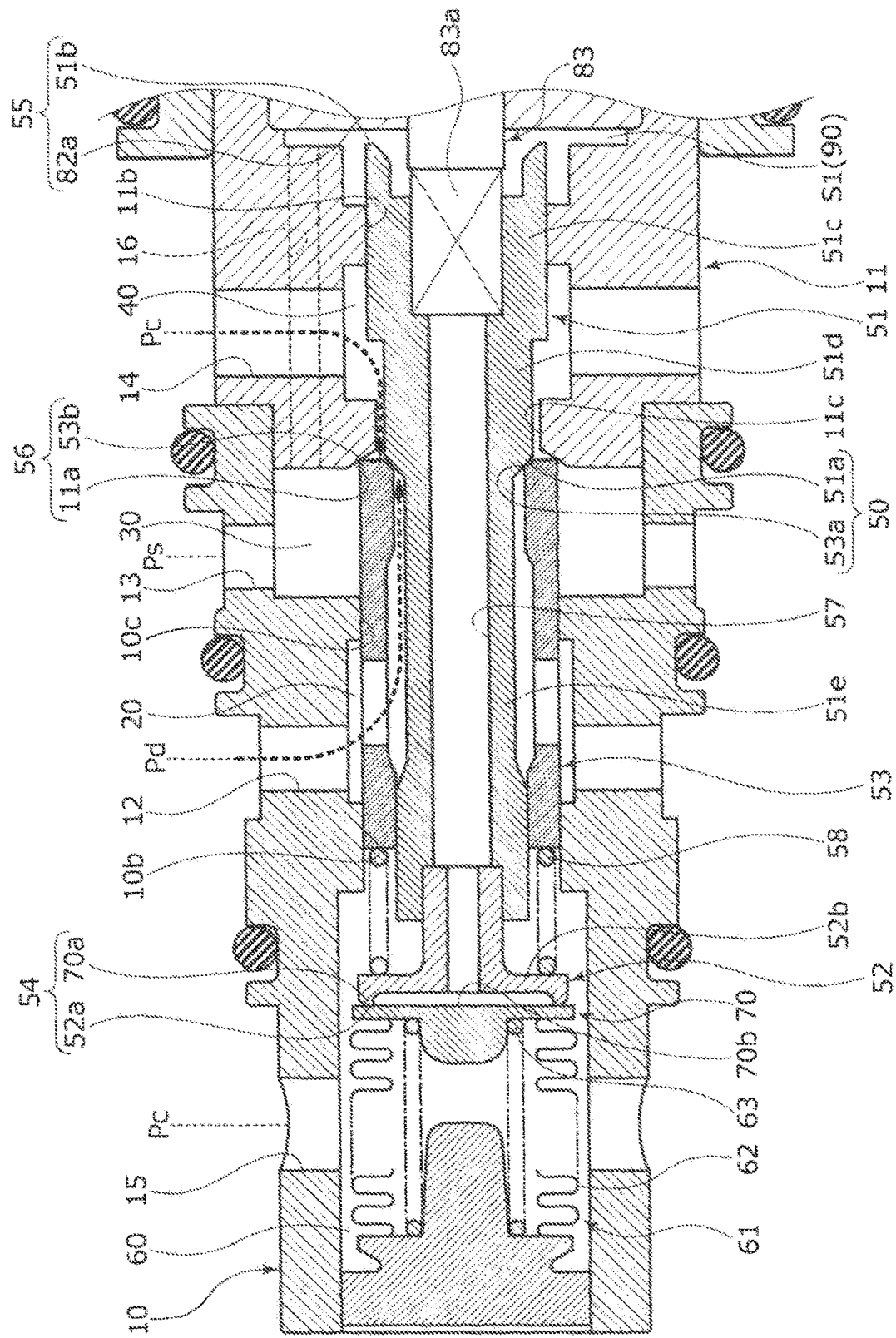
FIG. 5 is an enlarged cross-sectional view illustrating a state where the main valve and the CS valve are closed when the capacity control valve according to the embodiment is in an energized state (e.g., during normal control).
Figure 6:
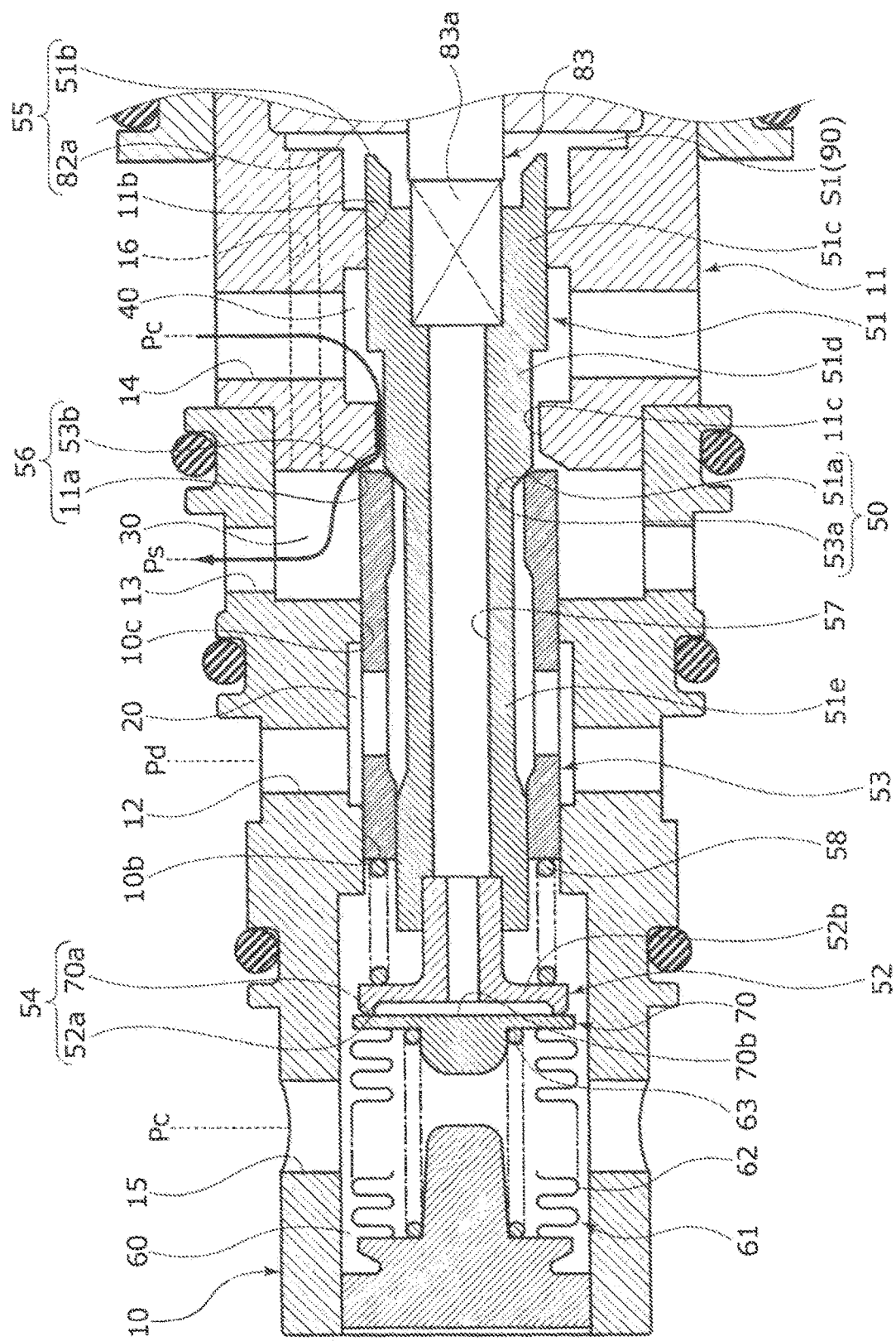
FIG. 6 is an enlarged cross-sectional view illustrating a state where the main valve is closed and the CS valve is opened when the capacity control valve according to the embodiment is in an energized state (e.g., maximum energized state).
Figure 8:
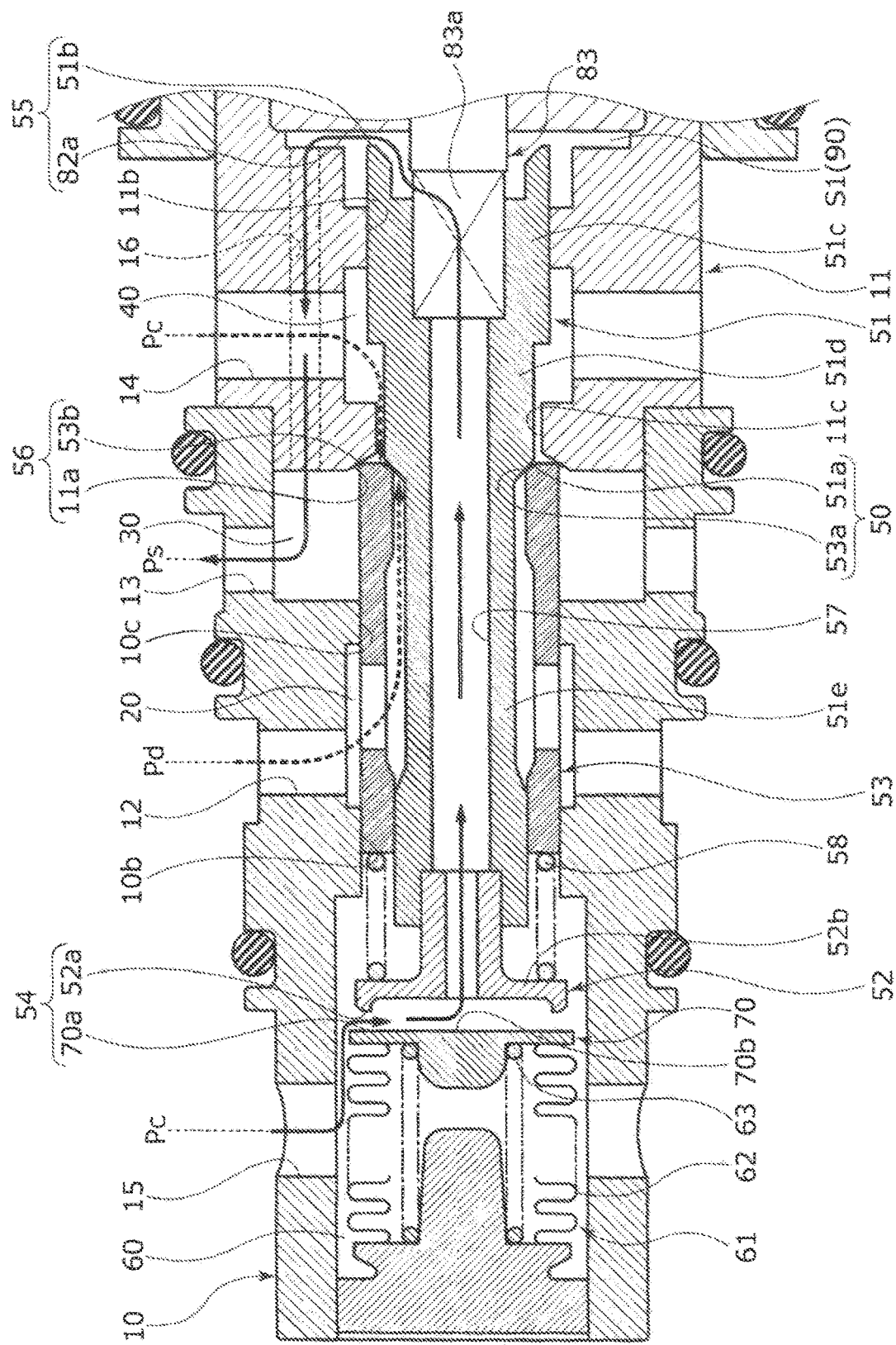
FIG. 8 is an enlarged cross-sectional view illustrating a state where the main valve and the CS valve are closed and a pressure sensitive valve is opened by a predetermined suction pressure when the capacity control valve according to the embodiment is in an energized state (i.e., during startup, during normal control, or the like).
Figure 9:
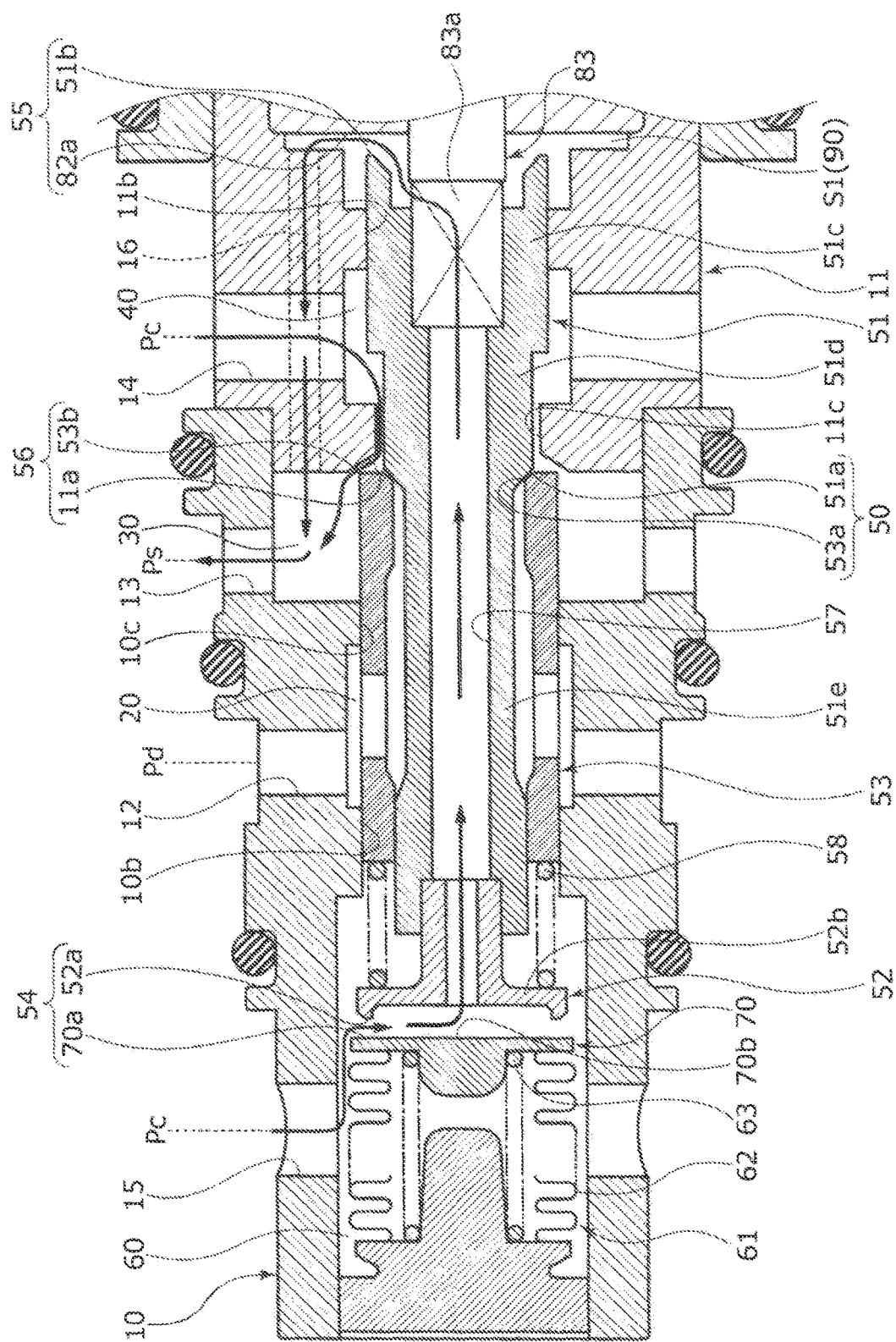
FIG. 9 is an enlarged cross-sectional view illustrating a state where the main valve is closed, the CS valve is opened, and the pressure sensitive valve is opened by the predetermined suction pressure when the capacity control valve according to the embodiment is in an energized state (e.g., maximum energized state).

In addition, the third valve chamber 40 can communicate with the first valve chamber 20 or the second valve chamber 30 via a gap that is formed in the radial direction between an inner peripheral surface of a shaft hole 11c of the left axial end portion of the second valve housing 11 and an outer peripheral surface of the medium diameter portion 51d of the main and auxiliary valve body 51. In more details, as illustrated in FIGS. 2 and 4, when the main valve 50 is opened and the CS valve 56 is closed, the first valve chamber 20 and the third valve chamber 40 communicate with each other, and the third valve chamber 40 and the second valve chamber 30 are isolated from each other. In addition, as illustrated in FIGS. 3, 5, and 8, when the main valve 50 and the CS valve 56 are closed, the first valve chamber 20 and the third valve chamber 40 are isolated from each other, and the third valve chamber 40 and the second valve chamber 30 are isolated from each other. In addition, as illustrated in FIGS. 6 and 9, when the main valve 50 is closed and the CS valve 56 is opened, the first valve chamber 20 and the third valve chamber 40 are isolated from each other, and the third valve chamber 40 and the second valve chamber 30 communicate with each other.

In addition, a Ps communication hole 16 penetrating through the second valve housing 11 in the axial direction is provided in the second valve housing 11 at a position not to interfere with the third valve chamber 40 and the first Pc port 14, and the second valve chamber 30 communicates with the accommodation chamber 90, namely, the space S1 via the Ps communication hole 16. Accordingly, the suction pressure Ps from the Ps port 13 is supplied to the accommodation chamber 90 via the second valve chamber 30 and the Ps communication hole 16. Incidentally, it is preferable that the flow passage area of the Ps communication hole 16 is set to a size such that the suction pressures Ps in the second valve chamber 30 and the accommodation chamber 90 can be substantially equal, for example, a flown passage area which is the half or more of the flow passage area of a first Pc-Ps flow passage (to be described later) or 1 mm or more of diameter of a hole.

As illustrated in FIGS. 4 to 6 and FIGS. 8 and 9, the main and auxiliary valve body 51 is formed in a substantially stepped cylindrical shape, and includes the large diameter portion 51c that is inserted into the guide hole 11b of the second valve housing 11, the medium diameter portion 51d that is formed on a left side in the axial direction of the large diameter portion 51c to have a smaller diameter than the large diameter portion 51c and is inserted into the shaft hole 11c of the second valve housing 11, and a small diameter portion 51e which is formed on a left side in the axial direction of the medium diameter portion 51d to have a smaller diameter than the medium diameter portion 51d and to which the CS valve body 53 formed in a cylindrical shape is externally fitted in a substantially sealed manner. Incidentally, the left axial end portion 83a of the drive rod 83 forming the solenoid 80 is inserted into and fixed to a right axial end portion of the main and auxiliary valve body 51, namely, a right axial end portion of the large diameter portion 51c, and the pressure sensitive valve member 52 as a separate body formed in a substantially cylindrical shape and in a substantially turret shape in a side view is inserted into and fixed to a left axial end portion of the main and auxiliary valve body 51, namely, a left axial end portion of the small diameter portion 51e in a substantially sealed manner. The drive rod 83, the main and auxiliary valve body 51, and the pressure sensitive valve member 52 are movable together in the axial direction.

In addition, since the left axial end portion 83a having a plate shape of the drive rod 83 is inserted into and fixed to the right, axial end portion of the large diameter portion 51c of the main and auxiliary valve body 51, a plate surface of the left axial end portion 83a of the drive rod 83 and an inner peripheral surface of the large diameter portion 51c of the main and auxiliary valve body 51 communicate with each other, and the fluid always flows from the space S1 to the intermediate communication passage 57.

In addition, the step portion 51a that is formed at substantially the center in the axial direction of the main and auxiliary valve body 51, namely, a left axial end of the medium diameter portion 51d is formed in a tapered shape that is tapered toward the left in the axial direction where the small diameter portion 51e is formed, and comes into contact with and separates from the main valve seat 53a that is formed in the inner diameter portion of the right axial end of the CS valve body 53.

In addition, the main and auxiliary valve body 51 is slidable in a state where a gap between an outer peripheral surface of the left axial end portion of the small diameter portion 51e and an inner peripheral surface of a left axial end portion of the CS valve body 53 is substantially sealed, and a gap that is formed in the radial direction formed between the main and auxiliary valve body 51 and the CS valve body 53 is partitioned off from the pressure sensitive chamber 60. Incidentally, the outer peripheral surface of the left axial end portion of the small diameter portion 51e of the main and auxiliary valve body 51 and the inner peripheral surface of the left axial end portion of the CS valve body 53 are slightly separated from each other in the radial direction to form a very small gap, and the main and auxiliary valve body 51 is smoothly movable relative to the CS valve body 53 in the axial direction.

In addition, since the small diameter portion 51e of the main and auxiliary valve body 51 is formed in a constricted shape where an outer peripheral surface is recessed toward an inner diameter side from a right axial end portion to substantially the center in the axial direction, and the CS valve body 53 externally fitted to the small diameter portion 51e is formed in a constricted shape where an inner peripheral surface at substantially the center in the axial direction is recessed toward an outer diameter side, when the main valve 50 is opened, a Pd-Pc flow passage (illustrated by a solid arrow in FIG. 4) with a large flow passage area from the Pd port 12 to the first Pc port 14 can be secured.

As illustrated in FIGS. 4 to 6 and FIGS. 8 and 9, a coil spring 58 as biasing means is externally fitted to the left axial end portion of the small diameter portion 51e of the main and auxiliary valve body 51. A left axial end of the coil spring 58 is in contact with a right surface in the axial direction of a flange portion 52b of the pressure sensitive valve member 52, and a right axial end of the coil spring 58 is in contact with a left axial end as the other end of the CS valve body 53. Incidentally, the coil spring 58 applies biasing force toward the right in the axial direction, namely, in a valve closing direction of the CS valve 56 such that the outer diameter portion 53b of the right axial end which is one end of the CS valve body 53 comes into contact with the CS valve seat 11a formed in the inner diameter portion of the left axial end of the second valve housing 11. In addition, the coil spring 58 is set to have a smaller spring constant than a coil spring 63 provided in the pressure sensitive body 61.

As illustrated in FIGS. 2 to 6 and FIGS. 8 and 9, the pressure sensitive body 61 mainly includes a bellows core 62 where the coil spring 63 is built in, and the adapter 70 which has a disk shape and as provided at a right axial end of the bellows core 62, and a left axial end of the bellows core 62 is fixed to the partition adjustment member 17.

In addition, the pressure sensitive body 61 is disposed in the pressure sensitive chamber 60, and the outer diameter portion 70a of the right axial end surface of the adapter 70 is seated on the pressure sensitive valve seat 52a of the left axial end of the pressure sensitive valve member 52 by the biasing force of the coil spring 63 and the bellows core 62. Namely, the leftward axial driving force of the solenoid 80 is applied to the pressure sensitive body 61 via the drive rod 83, the main and auxiliary valve body 51, and the pressure sensitive valve member 52, and the drive rod 83, the main and auxiliary valve body 51, and the pressure sensitive valve member 52 receive a rightward axial reaction force from the pressure sensitive body 61.

Here, a pressure distribution in the capacity control valve V will be described with reference to FIG. 3. Incidentally, FIG. 3 illustrates a state where the main valve 50, the CS valve 56, and the pressure sensitive valve 54 are closed and the auxiliary valve 55 is opened when the capacity control valve V is in an energized state (e.g., during normal control). As illustrated in FIG. 3, the control pressure Pc introduced from the first Pc port 14 is distributed from the third valve chamber 40 to a right side in the axial direction of the main valve 50 closed and an inner diameter side of the CS valve 56 closed, via the gap that is formed in the radial direction between the inner peripheral surface of the shaft hole 11c of the second valve housing 11 and the outer peripheral surface of the medium diameter portion 51d of the main and auxiliary valve body 51. In addition, the suction pressure Ps introduced from the Ps port 13 is distributed to an outer diameter side of the CS valve 56 closed in the second valve chamber 30, and is introduced from the second valve chamber 30 to the accommodation chamber 90 via the Ps communication hole 16 of the second valve housing 11 to be distributed to a Ps pressure receiving surface 70b, which is formed in the right axial end surface of the adapter 70 of the pressure sensitive body 61, via the intermediate communication passage 57 that is formed inside the main and auxiliary valve body 51 and the pressure sensitive valve member 52. In addition, the discharge pressure Pd introduced from the Pd port 12 is distributed from the first valve chamber 20 to a left side in the axial direction of the main valve 50 closed, via the Pd communication hole 53c of the CS valve body 53 and the gap that is formed in the radial direction between the inner peripheral surface of the CS valve body 53 and the outer peripheral surface of the main and auxiliary valve body 51. In addition, the control pressure Pc introduced from the second Pc port 15 is distributed in the pressure sensitive chamber 60. Incidentally, as illustrated in FIG. 3, since the suction pressures Ps are applied from both ends in the axial direction to the movable core 84, the drive rod 83, the main and auxiliary valve body 51, and the pressure sensitive valve member 52 that are moved together by the driving force of the solenoid 80, the valve body can be precisely controlled according to a current applied to the solenoid 80 in a state where the influence of the pressures is suppressed.

Next, an operation of the capacity control valve V, mainly, an opening and closing operation of the main valve 50 and the CS valve 56 will be described.

First, a de-energized state of the capacity control valve V will be described. As illustrated in FIGS. 2 and 4, when the capacity control valve V is in a de-energized state, since the movable core 84 is pressed rightward in the axial direction by the biasing force of the coil spring 85 forming the solenoid 80 or the biasing force of the coil spring 63 and the bellows core 62, the drive rod 83, the main and auxiliary valve body 51, and the pressure sensitive valve member 52 move rightward in the axial direction, so that the right axial end 51b of the main and auxiliary valve body 51 is seated on the auxiliary valve seat 82a of the fixed core 82 to close the auxiliary valve 55, and the step portion 51a of the main and auxiliary valve body 51 separates from the main valve seat 53a, which is formed in the inner diameter portion of the right axial end of the CS valve body 53, to open the main valve 50.

In addition, when the capacity control valve V is in a de-energized state, the step portion 51a of the main and auxiliary valve body 51 separates from the main valve seat 53a of the CS valve body 53, and the biasing force $F_{sp2}$ of the coil spring 58 is applied to press the CS valve body 53 rightward in the axial direction, namely, in the valve closing direction of the CS valve 56, so that the outer diameter portion 53b of the right axial end of the CS valve body 53 is seated on the CS valve seat 11a, which is formed in the inner diameter portion of the left axial end of the second valve housing 11, to close the CS valve 56.

At this time, the biasing force $F_{sp2}$ of the coil spring 58 is applied leftward in the axial direction to the main and auxiliary valve body 51 via the flange portion 52b of the pressure sensitive valve member 52, and the biasing force $F_{sp1}$ of the coil spring 85 and the biasing force $F_{bel}$ of the pressure sensitive body 61 (namely, the biasing force of the bellows core 62 and the coil spring 63) are applied rightward in the axial direction to the main and auxiliary valve body 51 via the drive rod 83 forming the solenoid 80 and the pressure sensitive valve member 52, respectively (namely, with a rightward direction being positive, force $F_{rod}1=F_{sp1}+F_{bel}-F_{sp2}$ is applied to the main and auxiliary valve body 51). Incidentally, the influence of the pressures is omitted due to being small.

Next, an energized state of the capacity control valve V will be described. As illustrated in FIG. 5, when the capacity control valve V is in an energized state (namely, during normal control, so-called duty control), if electromagnetic force $F_{sol}1$ generated by the application of a current to the solenoid 80 is greater than the force $F_{rod}1$ (i.e., $F_{sol}1>F_{rod}1$), since the movable core 84 is pulled toward a fixed core 82 side, namely, leftward in the axial direction, the drive rod 83 fixed to the movable core 84, the main and auxiliary valve body 51, and the pressure sensitive valve member 52 move together leftward in the axial direction, and the pressure sensitive body 61 is pressed leftward in the axial direction to be contracted, so that the right axial end 51b of the main and auxiliary valve body 51 separates from the auxiliary valve seat 82a of the fixed core 82 to open the auxiliary valve 55, and the step portion 51a of the main and auxiliary valve body 51 is seated on the main valve seat 53a of the CS valve body 53 to close the main valve 50.

At this time, the electromagnetic force $F_{sol}1$ toward the left in the axial direction, and the biasing force $F_{sp1}$ of the coil spring 85 and the biasing force $F_{bel}$ of the pressure sensitive body 61 toward the right in the axial direction are applied to the main and auxiliary valve body 51 (namely, with the rightward direction being positive, force $F_{rod}2=F_{sp1}+F_{bel}-F_{sol}1$ is applied to the main and auxiliary valve body 51). Incidentally, the biasing force $F_{sp2}$ of the coil spring 58 is applied leftward in the axial direction to the main and auxiliary valve body 51 until the step portion 51a of the main and auxiliary valve body 51 is seated on the main valve seat 53a of the CS valve body 53, and at the moment when the step portion 51a of the main and auxiliary valve body 51 is seated on the main valve seat 53a of the CS valve body 53, the CS valve body 53 and the coil spring 58 are held between the step portion 51a of the main and auxiliary valve body 51 and the flange portion 52b of the pressure sensitive valve member 52, which moves together with the main and auxiliary valve body 51, and thus the biasing force $F_{sp2}$ is not applied to the main and auxiliary valve body 51.

During normal control of the capacity control valve V, when the opening degree or opening time of the main valve 50 is adjusted to control the flow rate of the fluid from the Pd port 12 to the first Pc port 14, the current value is controlled such that the electromagnetic force ($F_{sol}1$) generated by the application of a current to the solenoid 80 is greater than the force $F_{rod}1$ (i.e., $F_{sol}1 > F_{rod}1$) and is less than the force $F_{rod}2$ (i.e., $F_{sol}1 < F_{rod}2$); and thereby the opening and closing of the main valve 50 can be controlled in a state where the closing of the CS valve 56 is maintained.

In addition, when the variable displacement compressor M is driven at the maximum capacity, as illustrated in FIG. 6, the capacity control valve V is brought into a maximum energized state (namely, energized state at the maximum duty during normal control) to cause electromagnetic force $F_{sol}2$ generated by the application of the maximum current to the solenoid 80 to be greater than the force $F_{rod}2$ (i.e., $F_{sol}2 > F_{rod}1$), so that the main and auxiliary valve body 51 fixed to the drive rod 83 pushes the CS valve body 53 leftward in the axial direction and the main and auxiliary valve body 51 moves together with the CS valve body 53 leftward in the axial direction; and thereby, the outer diameter portion 53b of the right axial end of the CS valve body 53 separates from the CS valve seat 11a of the second valve housing 11 to open the CS valve 56. Accordingly, as the drive rod 83 moves while a closed state of the main valve 50 is maintained, the main and auxiliary valve body 51 moves together with the CS valve body 53 to open the CS valve 56, and the first Pc-Ps flow passage (illustrated by a solid arrow in FIG. 6) through which the first Pc port 14 and the Ps port 13 communicate with each other is formed, namely, the control chamber 4 and the suction chamber 3 communicate with each other, so that the control pressure Pc can be quickly lowered to maintain the control pressure Pc and the suction pressure Ps at equal pressure. Therefore, the capacity control valve V having a high compression efficiency can be provided. In addition, even during startup of the variable displacement compressor M, the capacity control valve V is brought into a maximum energized state to open the CS valve 56 and to allow the first Pc port 14 and the Ps port 13 to communicate with each other. Therefore, the capacity control valve V having a good fluid discharge function during startup can be provided.

Figure 7:
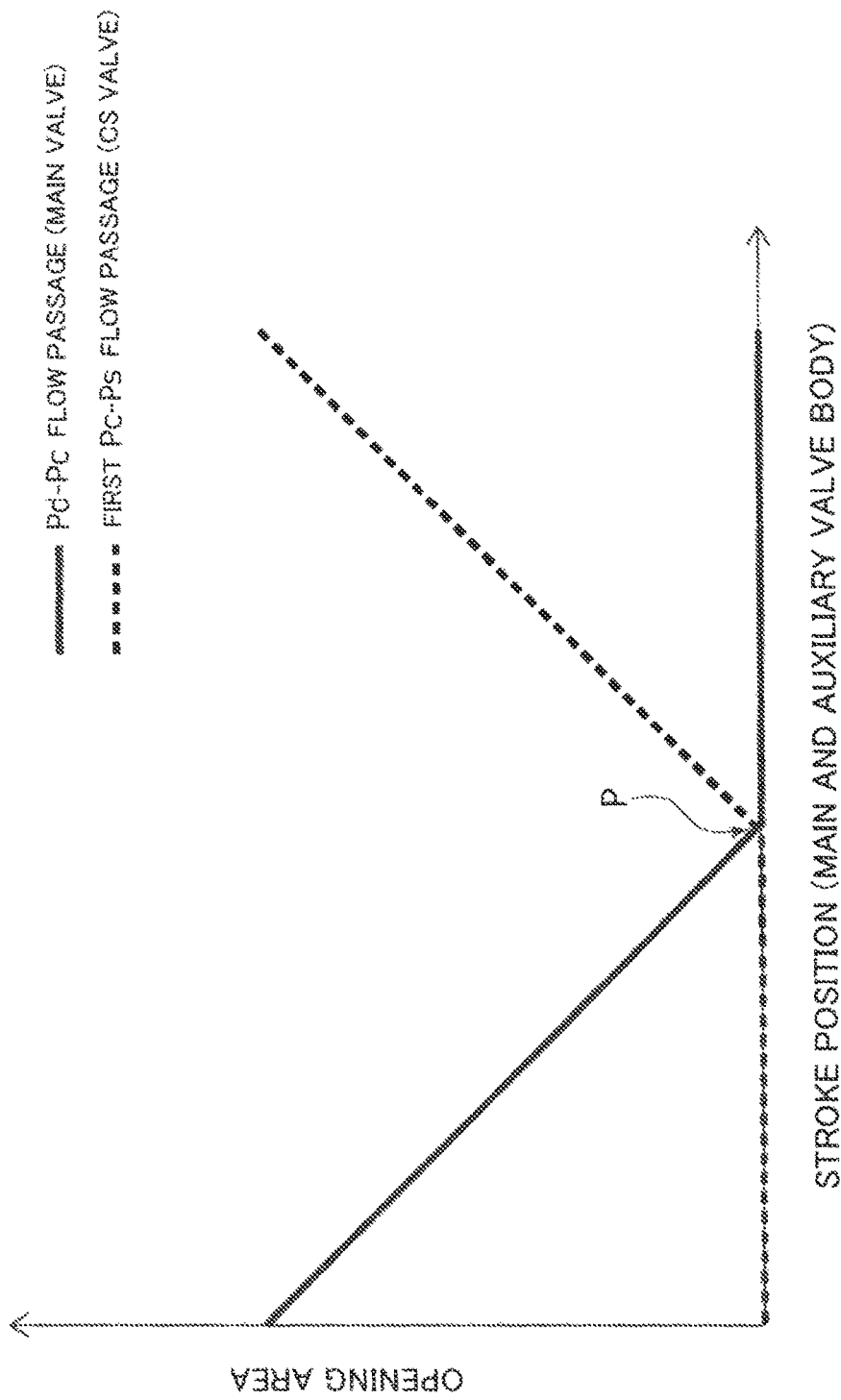
FIG. 7 is a graph describing an open and closed state of the main valve and an open and closed state of the CS valve with respect to the stroke position of a main and auxiliary valve body in the capacity control valve according to the embodiment.

Next, an open and closed state of the main valve 50 and an open and closed state of the CS valve 56 with respect to the stroke position of the main and auxiliary valve body 51 will be described with reference to FIG. 7. Incidentally, the horizontal axis of FIG. 7 represents the stroke position to which the main and auxiliary valve body 51 moves according to a current applied to the solenoid 80. As illustrated in FIG. 7, when the stroke position of the main and auxiliary valve body 51 is 0, which corresponds to when the solenoid 80 is de-energized, the CS valve 56 is closed and the opening area of the main valve 50 is maximized. The opening area of the main valve 50 (i.e., Pd-Pc flow passage) is linearly reduced according to the stroke position of the main and auxiliary valve body 51, which is dependent on a current applied to the solenoid 80. At this time, the closed state of the CS valve 56 is maintained. When the stroke position of the main and auxiliary valve body 51 reaches a point P, the main valve 50 and the CS valve 56 are closed. Then, when the stroke position of the main and auxiliary valve body 51 passes the point P, the closed state of the main valve 50 is maintained, and the opening area of the CS valve 56 (i.e., first Pc-Ps flow passage) is linearly increased according to the stroke position of the main and auxiliary valve body 51. In such a manner, the switching of opening and closing of the main valve 50 and the CS valve 56 can be performed depending on the stroke position of the main and auxiliary valve body 51 with respect to the point P, and thus the controllability is improved.

In addition, as illustrated in FIGS. 8 and 9, during startup or normal control of the capacity control valve V, when the force based on the suction pressure Ps, namely, the suction pressure Ps in the intermediate communication passage 57 which is applied to the Ps pressure receiving surface 70b of the adapter 70 of the pressure sensitive body 61 is greater than the biasing force of the bellows core 62 and the coil spring 63 that form the pressure sensitive body 61, due to contraction of the pressure sensitive body 61, the outer diameter portion 70a of the right axial end surface of the adapter 70 separates from the pressure sensitive valve seat 52a of the pressure sensitive valve member 52 to open the pressure sensitive valve 54, and a second Pc-Ps flow passage (illustrated by solid arrows in FIGS. 8 and 9) through which the second Pc port 15 and the Ps port 13 communicate with each other is formed, namely, the control chamber 4 and the suction chamber 3 communicate with each other via the intermediate communication passage 57, so that the control pressure Pc can be quickly lowered to maintain the control pressure Pc and the suction pressure Ps at equal pressure; and thereby, the capacity control valve V having a stable fluid discharge function and compression performance during startup can be provided. Particularly, as illustrated in FIG. 8, since the capacity control valve V is brought into a maximum energized state to open the CS valve 56, and the pressure sensitive valve 54 is opened by a predetermined suction pressure Ps, two Pc-Ps flow passages can communicate with each other, and thus the fluid discharge function during startup can be further improved.

In addition, during startup, normal control, or the like, since the main and auxiliary valve body 51 moves leftward in the axial direction to open the auxiliary valve 55, when the pressure sensitive valve 54 is opened by the predetermined suction pressure Ps, the intermediate communication passage 57 becomes effective to allow the pressure sensitive chamber 60 and the Ps port 13 to communicate with each other.

In addition, since the CS valve body 53 is externally fitted to the main and auxiliary valve body 51, and the main valve seat 53a is formed in the inner diameter portion of the CS valve body 53, the capacity control valve V including the CS valve 56 can be configured more simply and compactly, and the main and auxiliary valve body 51 can move together with the CS valve body 53 while a closed state of the main valve 50 is reliably maintained.

In addition, since the main valve seat 53a forming the main valve 50 is formed in the inner diameter portion of the right axial end that is one end of the CS valve body 53, and the CS valve 56 including the outer diameter portion 53b and the CS valve seat 11a is formed on the outer diameter side thereof, switching between the Pd-Pc flow passage and the first Pc-Ps flow passage by the opening and closing of the main valve 50 and the CS valve 56 can be smoothly performed, and thus the responsiveness is good.

In addition, since the CS valve body 53 is biased rightward in the axial direction, namely, in the valve closing direction of the CS valve 56 by the coil spring 58, when the current value is decreased, the CS valve body 53 can reliably move to a closed valve position, and the capacity control valve V can immediately return from the maximum energized state at the maximum duty to a state less energized than the maximum energized state (duty control).

In addition, as illustrated in FIG. 3, since the control pressure Pc supplied from the first Pc port 14 to the third valve chamber 40 is introduced to a right axial end side that is one end side of the CS valve body 53, and the control pressure Pc supplied from the second Pc port 15 to the pressure sensitive chamber 60 is introduced to a left axial end side that is the other end side of the CS valve body 53, the control pressures Pc can be applied to the CS valve body 53 from both ends in the axial direction, and the CS valve body 53 can move together with the main and auxiliary valve body 51 in a state where the influence of the pressures is suppressed; and thereby, the valve body can be precisely controlled according to a current applied to the solenoid 80. Furthermore, since an effective area A of the left axial end portion that is the other end portion of the CS valve body 53 is set to be equal to an effective area B of the right axial end portion that is one end portion of the CS valve body 53 (A=B), the control pressures Pc applied to both ends in the axial direction of the CS valve body 53 are cancelled out, and thus the valve body can be more precisely controlled.

The embodiment of the invention has been described above with reference to the drawings; however, the specific configuration is not limited to the embodiment, and the invention also includes changes or additions that are made without departing from the concept of the invention.

For example, the above embodiment has described a mode where the effective areas A and B of both ends in the axial direction of the CS valve body 53 are set to be equal (A=B) so that the control pressures Pc applied to both ends in the axial direction of the CS valve body 53 are cancelled out; however, the invention is not limited to the configuration, for example, the effective area A of the left axial end of the CS valve body may be set to be larger than the effective area B of the right axial end of the CS valve body (i.e., A>B), and thus when the main valve 50 is closed, the control pressure Pc is applied rightward in the axial direction, namely, in the valve opening direction to adjust the driving force of the solenoid 80; and thereby, control characteristics of the main and auxiliary valve body 51 are changed. Incidentally, the spring constant of the coil spring 58 may be changed to change the control characteristics of the main and auxiliary valve body 51.

In addition, the disposition in the axial direction of the CS valve body 53 with respect to the main and auxiliary valve body 51, the forming position in the axial direction of the CS valve seat 11a in the second valve housing 11, or the dimensions, shape, or the like of the CS valve body 53 may be changed to appropriately adjust the opening and closing timing of the main valve 50 and the CS valve 56 depending on the stroke position of the main and auxiliary valve body 51 which is based on the driving force of the solenoid 80.

In addition, the above embodiment has described an example where the CS valve 56 is configured such that the CS valve body 53 that moves relative to the main and auxiliary valve body 51 comes into contact with and separates from the CS valve seat 11a of the second valve housing 11; however, other configurations may be adopted, and for example, the CS valve may have a spool valve structure.

In addition, a groove extending in a circumferential direction may be formed in at least one of the outer peripheral surfaces of the main and auxiliary valve body 51 and the CS valve body 53 and the inner peripheral surfaces of the guide holes 10b and 10c of the first valve housing 10 and the guide hole lib of the second valve housing 11, and accordingly, the sealability of sliding portions between the main and auxiliary valve body 51 and the first valve housing 10 and between the CS valve body 53 and the second valve housing 11 is improved by the labyrinth effect of the groove, and thus leakage of the fluid can be suppressed.

In addition, an example where the main and auxiliary valve body 51 and the pressure sensitive valve member 52 are formed as separate bodies has been described; however, both may be integrally formed.

In addition, the communication passage through which the control chamber 4 and the suction chamber 3 of the variable displacement compressor M communicate directly with each other, and the fixed orifice may not be provided.

In addition, in the above embodiment, the auxiliary valve 55 may not be provided, and the right axial end of the main and auxiliary valve body 51 may serve as a support member receiving an axial load, and does not necessarily require a sealing function.

In addition, the first valve housing 10 and the second valve housing 11 that form the valve housing may be integrally formed.

In addition, instead that the coil spring is used inside the pressure sensitive body 61, the bellows core 62 may have biasing force.

REFERENCE SIGNS LIST

1 Casing
2 Discharge chamber
3 Suction chamber
4 Control chamber
10 First valve housing (valve housing)
11 Second valve housing (valve housing)
11a CS valve seat
12 Pd port (discharge port)
13 Ps port (suction port)
14 First Pc port (control port)
15 Second Pc port
16 Ps communication hole
20 First valve chamber
30 Second valve chamber
40 Third valve chamber
50 Main valve
51 Main and auxiliary valve body (main valve body)
51a Step portion.
51b Right axial end
Pressure sensitive valve member
52a Pressure sensitive valve seat (opening and closing valve seat)
53 CS valve body
53a Main valve seat
53b Outer diameter portion
54 Pressure sensitive valve (opening and closing valve)
55 Auxiliary valve
56 CS valve
57 Intermediate communication passage (CS communication passage)
58 Coil spring (biasing means)

60 Pressure sensitive chamber (control fluid supply chamber)
61 Pressure sensitive body (opening and closing valve body)
62 Bellows core
63 Coil spring
70 Adapter
70a Outer diameter portion
70b Ps pressure receiving surface
80 Solenoid
82 Fixed core
82a Auxiliary valve seat
83 Drive rod (rod)
84 Movable core
85 Coil spring
90 Accommodation chamber
A, B Effective area of CS valve body
Pc Control pressure
Pd Discharge pressure
Ps Suction pressure
S1, S2 Space
V Capacity control valve

The invention claimed is:

1. A capacity control valve comprising:
a valve housing provided with a discharge port through which a discharge fluid at a discharge pressure passes, a suction port through which a suction fluid at a suction pressure passes, and a control port through which a control fluid at a control pressure passes;
a rod driven by a solenoid;
a main valve that includes a main valve seat and a main valve body to open and close a communication between the discharge port and the control port in accordance with a movement of the rod moves;
an opening and closing valve including an opening and closing valve seat and an opening and closing valve body biased in a valve closing direction, the opening and closing valve being configured to open and close a CS communication passage communicating with the suction port and a control fluid supply chamber formed in the valve housing, the control fluid being supplied to the control fluid supply chamber; and
a CS valve that includes a CS valve seat and a CS valve body to open and close a communication between the control port and the suction port, the CS valve body being disposed so as to be movable relative to the main valve body,
wherein the main valve body and the CS valve body move together as the rod moves in a closed state of the main valve.

2. The capacity control valve according to claim 1, wherein the CS valve body is externally fitted to the main valve body, and the main valve seat is formed in an inner diameter portion of the CS valve body.

3. The capacity control valve according to claim 2, wherein the main valve seat is formed at one end of the CS valve body, and the CS valve seat is formed on an outer diameter side of the main valve seat.

4. The capacity control valve according to claim 3, wherein the CS valve body is biased in a valve closing direction of the CS valve by a spring.

5. The capacity control valve according to claim 4, wherein the control fluid from the control port is introduced to one end side of the CS valve body, and the control fluid supplied to the control fluid supply chamber is introduced to the other end side of the CS valve body.

6. The capacity control valve according to claim 5, wherein effective areas of both ends of the CS valve body are equal to each other.

7. The capacity control valve according to claim 6, wherein the main valve body forms an auxiliary valve that opens and closes a communication between the CS communication passage and the suction port.

8. The capacity control valve according to claim 3, wherein the main valve body forms an auxiliary valve that opens and closes a communication between the CS communication passage and the suction port.

9. The capacity control valve according to claim 2, wherein the CS valve body is biased in a valve closing direction of the CS valve by a spring.

10. The capacity control valve according to claim 2, wherein the control fluid from the control port is introduced to one end side of the CS valve body, and the control fluid supplied to the control fluid supply chamber is introduced to the other end side of the CS valve body.

11. The capacity control valve according to claim 10, wherein effective areas of both ends of the CS valve body are equal to each other.

12. The capacity control valve according to claim 2, wherein the main valve body forms an auxiliary valve that opens and closes a communication between the CS communication passage and the suction port.

13. The capacity control valve according to claim 1, wherein the CS valve body is biased in a valve closing direction of the CS valve by a spring.

14. The capacity control valve according to claim 13, wherein the main valve body forms an auxiliary valve that opens and closes a communication between the CS communication passage and the suction port.

15. The capacity control valve according to claim 1, wherein the control fluid from the control port is introduced to one end side of the CS valve body, and the control fluid supplied to the control fluid supply chamber is introduced to the other end side of the CS valve body.

16. The capacity control valve according to claim 15, wherein effective areas of both ends of the CS valve body are equal to each other.

17. The capacity control valve according to claim 15, wherein the main valve body forms an auxiliary valve that opens and closes a communication between the CS communication passage and the suction port.

18. The capacity control valve according to claim 16, wherein the main valve body forms an auxiliary valve that opens and closes a communication between the CS communication passage and the suction port.

19. The capacity control valve according to claim 1, wherein the main valve body forms an auxiliary valve that opens and closes a communication between the CS communication passage and the suction port.

* * * * *